United States Patent [19]

Gray

[11] 4,189,964
[45] Feb. 26, 1980

[54] DEVICE TO REMOVE CONCENTRIC KNOCKOUTS IN ELECTRICAL APPARATUS

[75] Inventor: James W. Gray, Tucson, Ariz.

[73] Assignee: Thomas J. Eaton, Jr., Tucson, Ariz.; a part interest

[21] Appl. No.: 916,110

[22] Filed: Jun. 16, 1978

[51] Int. Cl.² .......................................... B25B 27/00
[52] U.S. Cl. .................................. 81/3 R; 7/144; 30/360
[58] Field of Search ............... 7/125, 132, 137, 144; 30/360; 81/1 R, 3 R

[56] References Cited

U.S. PATENT DOCUMENTS

| | | |
|---|---|---|
| 1,061,661 | 5/1913 | Cloes . |
| 2,329,387 | 9/1943 | Brenning . |
| 3,025,600 | 3/1962 | Leibinger ........................ 30/360 X |
| 3,105,299 | 10/1963 | Wirtanen ............................ 30/360 |
| 3,564,716 | 2/1971 | Burrows ............................ 30/360 |
| 3,790,976 | 2/1974 | Stencil ............................ 7/144 X |
| 3,835,860 | 9/1974 | Garretson . |

Primary Examiner—James G. Smith
Attorney, Agent, or Firm—J. Michael McClanahan

[57] ABSTRACT

A device to remove concentric knockouts from electrical apparatus comprising a pair of handles adapted to open and close about a pivotal point, a first and second lever attached to the handles proximate their pivotal point, said levers having a common fulcrum or pivotal point interposed one end, and a shearing and punch assembly attached to the other ends. The shearing and punch assembly comprises an elongated shaft pivotally attached at the free end of the first lever with a rounded enlarged punching nose on the other end, the shaft encircled by a plurality of concentric cylinders, the inner cylinder of which is pivotally attached to the free end of the second lever and the outer of the concentric cylinders rotatable in a nonslidable position about the inner cylinder, the outer cylinder having attached to its periphery a shear segment which extends beyond the end of the cylinder, the elongated shaft permitted to slide interiorly to the inner cylinder whereby metal concentric or eccentric knockouts in electrical apparatus may be placed between the shaft enlarged nose and the shearing segment, such that when the shaft enlarged nose is drawn towards the shearing segment, the metal will be sheared; the shaft nose end also adapted to punch out a pre-punched center knockout in electrical apparatus before the concentric knockouts are sheared by the tool.

10 Claims, 5 Drawing Figures

DEVICE TO REMOVE CONCENTRIC KNOCKOUTS IN ELECTRICAL APPARATUS

BACKGROUND OF THE INVENTION

In the electrical trade, electric wires are run through metal tubular conduits where the conduits are joined with electrical meter boxes, circuit breaker boxes, electrical gutters and other electrical apparatus equipment where it is necessary to join the pieces of the outer protective metal covering. To this end, electrical manufacturers have prepared knockouts in the sides of the electrical meters, boxes, gutters and the like to accept the electrical metal tubular conduit which contains the electrical wires. Normally, a typical concentric knockout will consist of a partially punched interior circle and then a series of three or four partially pre-punched concentric rings. When it is desired to enlarge the hole beyond the center prepunched portion, these concentric rings must be consecutively removed until the desired hole diameter is achieved.

The concentric rings have been pre-punched through the majority of the circumference, however, there is generally two to four lands in the ring where they have not been punched. These lands, which normally are $\frac{1}{8}$ to $\frac{1}{4}$ of an inch across, must be cut in order to remove the concentric ring and thereby enlarge the hole.

Heretofore, there have not been problems in removing the central plug, however, there has been great difficulty in cutting the lands of the concentric ring. Different means have been adopted to cut these lands, including hammering on the concentric ring until the land has broken or just by drilling out the concentric ring itself. In the case of hammering upon the ring, a substantial danger is run in deforming adjacent knockouts or surrounding metal. Other methods are to apply a cold chisel to the land and thereby sever its connection between the concentric rings.

Perhaps the most popular way of cutting the land is to grab the inner concentric ring with the pair of electricians pliers and then to twist the ring until the land is twisted in half and the ring freed. The methods above described have not been satisfactory in practice and it is most common now for electricians to hammer out all knockouts and then apply reducing washers with bushings to achieve the desired opening or to cut separate holes that they need in the electrical equipment by some other method such as a hole punch. This latter method, however, does not take advantage of the pre-punched knockouts which have been provided by the manufacturer nor is this method fast or efficient.

Accordingly, there is a great need for a shearing tool which permits rapid shearing of the concentric ring lands in order that they may be removed for installation of electrical tubular conduit.

SUMMARY OF THE INVENTION

The invention disclosed herein comprises a device by which the center pre-punched opening in electrical equipment apparatus may be readily removed, and the lands connecting partially pre-punched concentric rings knockouts in electrical equipment apparatus may be speedily and efficiently sheared in order to enlarge the opening to the desired size.

To that end, the applicant has provided a hand held tool having a pair of plier-like handles joined at one end and proximate that joining end, a pair of connected levers which in turn connect with the shearing and punching assembly. The two levers, which are connected between their ends at a common pivotal point, provide compound lever means supplying mechanical advantage to enhance the shearing operation. To the other end of one of the levers is attached a shaft which has at its non-attached end an enlarged nose which engages the metal electrical apparatus outside and around the periphery of the central knockout opening by protruding the nose through the central opening and thereby brings the metal material against a shearing edge, aligning one of the lands in the concentric ring edge with the said shearing edge. The shearing edge is attached to the outside periphery of the larger of two concentric cylinders, the smaller of the concentric cylinder surrounding in part the aforementioned shaft. The inner of the two concentric cylinders attaches to the other end of the second above lever. The second outer concentric cylinder is in lengthwise stationary but rotational relationship with the inner cylinder. The opening and closing of the handles forces the interior shaft to slide inwardly and outwardly of the interior cylinder. The outer cylinder supplies an extending tooth-like shearing segment which contains the shearing edge by which the enlarged nose of the central shaft must pass in close relationship. Thus metal between the enlarged nose and the shearing edge is severed. The enlarged nose of the central shaft also provides the means by which to punch out the centrally located knockout.

Accordingly, it is an object of the subject invention to provide a means to remove the central pre-punched knockout formed in electrical equipment apparatus.

It is another object of the subject invention to provide a means by which the lands in the concentric partially pre-punched rings in electrical apparatus knockouts may be severed to remove the rings.

It is another object of the subject invention to provide a means whereby the shearing segment may be rotated to shear any of the plurality of lands formed in pre-punched concentric ring knockouts in electrical apparatus without having to change the position of the handles.

DETAILED DESCRIPTION OF PREFERRED EMBODIMENT

Figures 1, 3:
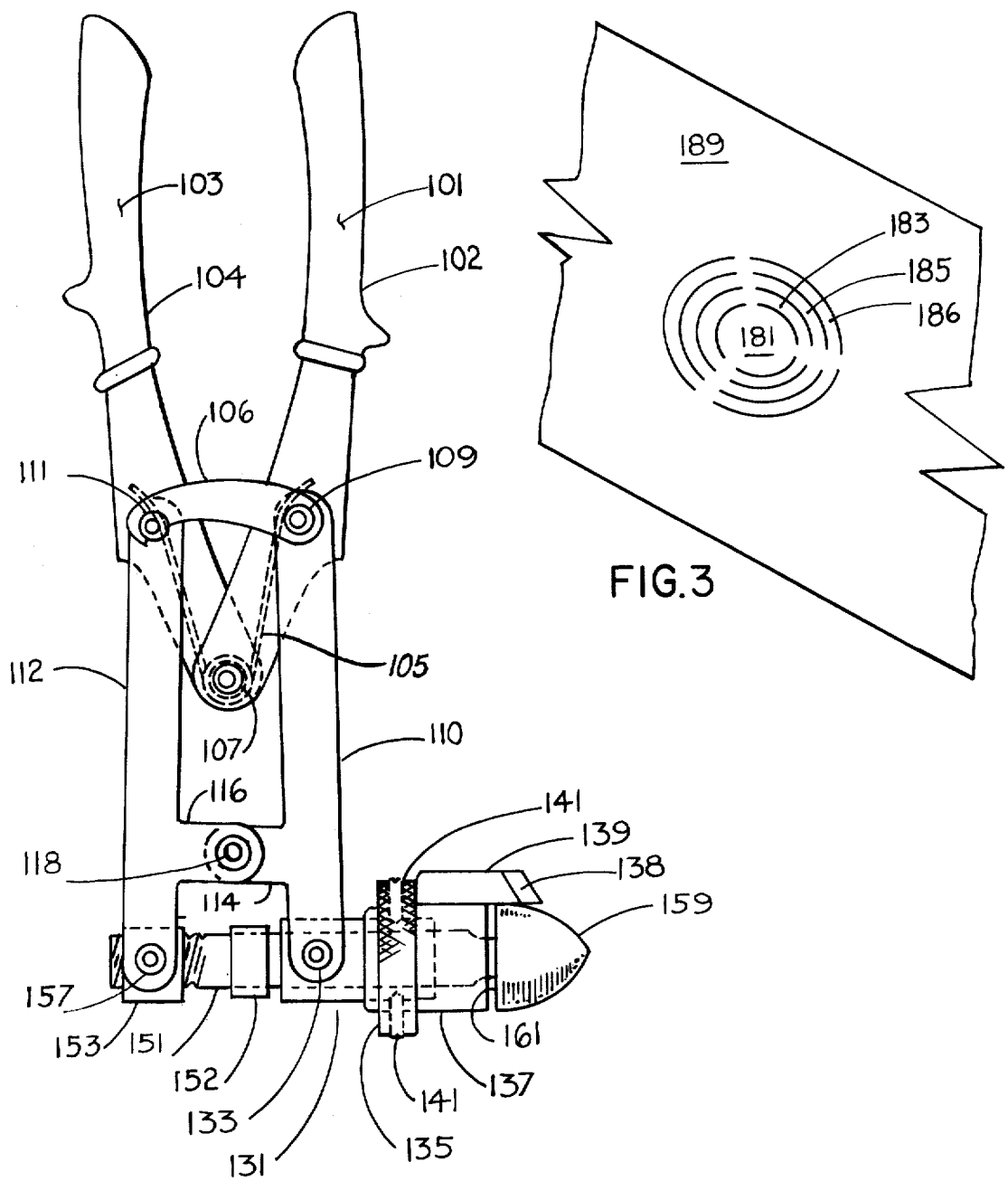
FIG. 1 is the side view of the subject invention in its closed state.
FIG. 3 is the top view of the concentric knockouts provided in electrical equipment apparatus by manufacturers.

Referring to FIG. 1, a full length side view of the subject invention is shown. Proceeding from the top of FIG. 1 down, the handles 101 and 103 are shown with their plastic grips 102 and 104 respectively, coating the lower gripping portion. The handles open and close in scissors fashion about handle pivot 107 which is located at the distal end from that portion which is held by the hand, handle 103 riding interiorly to a stirrup formed at the pivot end of the other handle 101. Located near handle pivot 107 and the ends of handles 101 and 103 are lever pivots 109 and 111 which attach respectively levers 110 and 112 to handles 101 and 103. Levers 110 and 112 are generally elongated levers having bifurcations on opposite sides of center joining arms 114 and 116. Again, these arms which attach to their respective levers, join together in a modified tongue and groove configuration having a common lever arm pivot pin 118. Arm 114 provides the tongue extending into a groove cut in arm 116. Attached to the ends of levers 110 and 112 distal their connection with the handles 101 and 103, are the invention's shearing and bullet nose section of the tool. More specifically, shear assembly cylinder 131 is pivotally attached to a stirrup formed in lever 110 through means of shear assembly cylinder pivot pin 133, which does not penetrate through to the center of shear assembly cylinder 131 but protrudes outwardly on opposite sides of the exterior surface of shear assembly cylinder 131 to attach to opposite fingers of the bifurcation or stirrup which was formed in lever 110. Shear assembly cylinder 131 extends generally perpendicularly from the longitudinal direction of lever 110. Thus, in viewing shear assembly cylinder 131 in FIG. 1, it can be seen that its freedom is limited to a slight pitching motion.

Encompassing the free end of shear assembly cylinder 131 in nesting fashion is clamping barrel 137. Clamping barrel 137 has knurled knob 135 and rotatable shear segment 139 attached to it as follows. Knurled knob 135 is an annular ring which may be formed as one piece with clamping barrel 137 or it may be an annular ring having its internal opening attached to the exterior peripheral surface of clamping barrel 137 by welding or other method of attachment, such as an adhesive. The exterior peripheral surface of knurled knob 135 has been machine knurled for operator handling and turning comfort. Attached longitudinally to the outer peripheral surface of clamping barrel 137 is rotatable shear segment 139. Rotatable shear segment 139 is in cross section generally a rectangle with one side an elongated, arcuate, concave surface conforming to the outer cylindrical surface of clamping barrel 137 and is attached to clamping barrel 137 by welding or other adhesive means. Rotatable shear segment 139 terminates at one end by knurled knob 135 and at its other end, protrudes, in the preferred embodiment, about 3/16 inch beyond the flat circular cross section end of clamping barrel 137. Although in the preferred embodiment clamping barrel 137 and knurled knob 135 are made from one piece of metal and rotatable shear segment 139 was brazed to clamping barrel 137, this method of construction does not preclude the three portions being made from the same piece of metal or being made from individual pieces of metal and attached to each other in the proper orientation. At the end of rotatable shear segment 139, a beveled shear surface 138 is ground.

As mentioned before, clamping barrel 137, which rotates about the cylindrical periphery of shear assembly cylinder 131, is held in its rotational place by means of the pair of diametrically opposed rounded end set screws 141 which are screwed into tapped holes in knurled knob 135 to engage in an annular groove formed in the outer peripherial surface of shear assembly cylinder 131. Through means of these set screws 141, clamping barrel 137 may also be removed as desired.

Protruding centrally through both shear assembly cylinder 131 and clamping barrel 137 is shaft 151 which has at one end, machine nut 153 screwed onto threads 155 formed at that end. Machine nut 153 in turn has extending outwardly, on opposite sides, pivot pins 157 which connect with the two fingers forming the bifurcation in lever 112. Of course pivot pins 157 do not protrude to the central portion of machine nut 153 nor through the interior of shaft 151. Obviously then, shaft 151's relative placement in relationship to machine nut 153 may be varied by screwing the shaft in or out of the nut. Annular sleeve stop 152, on annular ring, resides slidably on shaft 151 and prevents, in end result, handles 101 and 103 from opening too wide.

On the opposite end of shaft 151 is bullet nose element 159. Opposite the bullet nose portion of element 159 is flat circular surface 161, to which surface at its center is attached shaft 151. The diameter of flat circular surface 161 is the same as the outer diameter of clamping barrel 137 such that the outer peripherial edge of flat circular surface 161 which begins to form the rounded nose section of element 159 makes sliding contact with the lower concave rounded portion of rotatable shear segment 139.

Thus as may be seen from FIG. 1, shaft 151 is slidable interiorly to shear assembly cylinder 131 and clamping barrel 137 which permits the raising and lowering of bullet nose element 159 to and away from the end washer shaped surface of clamping barrel 137. This raising and lowering motion of bullet nose element 159 may be easily understood by referring to FIG. 1 and showing the operation of the invention as follows.

Initially, holding catch 106, which pivots about lever pivot pin 109 to catch in a hook shaped arm lever pivot pin 111, is released. This permits handles 101 and 103 to open in a spread apart position which, in the preferred embodiment, is forcibly accomplished by means of a wound compression type spring 105 having its opposite ends urging apart handles 101 and 103 proximate the handle pivot pin 107. When handles 101 and 103 do spread apart, the attached ends of levers 110 and 112 do also spread apart about lever arm pivot pin 118 with the result that the opposite ends are urged closer together until contact is made with annular sleeve stop 152. As the opposite ends of levers 110 and 112 come closer together, shear assembly cylinder 131 approaches machine nut 153 and bullet nose element 159 proceeds away from clamping barrel 137 until the flat circular surface 161 of bullet nose element 159 completely clears the protruding beveled shear surface 138 end of rotatable shear segment 139. Flat circular surface 161 clears rotatable shear segment 139 by a distance sufficient to accept the sheet metal with which the tool is designed to work as explained later, a distance nominally more than 1/16 inch but less than ¼ inch. It is obvious that there need not be dimensional limits placed on the invention.

If the handles are then closed, through the compound levering action enjoyed by the location of the combination of elements in the invention, the bullet nose element 159 circular surface 161 is drawn to the end surface of clamping barrel 137 with a great amount of force, sufficient force to shear sheet iron or other materials which may be placed between flat circular surface 161 and beveled shear surface 138 of rotatable shear segment 139.

In the preferred embodiment, the numerous pivot pins, 107, 109, and 111, which are located in the invention were made of machine bolts and attaching nuts. With the combination of elements in this invention, the tool components would necessarily pivot as required and, by having enlarged ends on opposite ends of the central shaft, loss of the pivot pin by falling out was minimized. The only exception to this was the pivot pins 157 and 133 which penetrated lever 112 to machine nut 153 and lever 110 to shear assembly cylinder 131 respectively. In this case, threads were cut into the fingers forming the bifurcation at the ends of levers 112 and 110. Then, holes were drilled and tapped on opposite sides of machine nut 153 and shear assembly 131 through to the central opening. Then rounded head machine screws were screwed into the threads formed in lever 112 and 110 to engage the threaded holes in the machine nut 153 and shear assembly cylinder 131, being careful not to permit the machine screws to penetrate through the sides of machine nut 153 and shear assembly cylinder 131. Thus, the required pivotal action is permitted.

Figure 2:
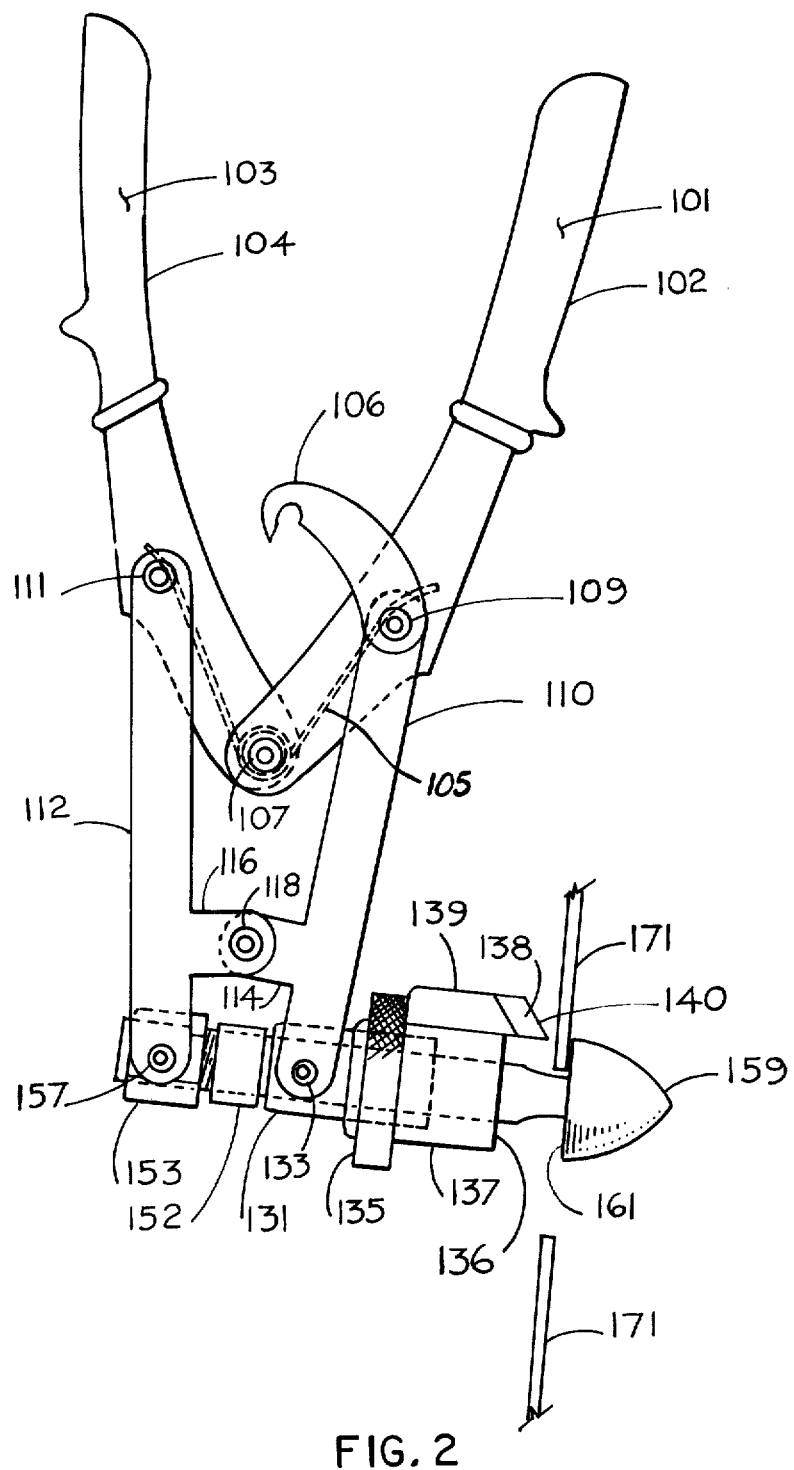
FIG. 2 is a side view of the subject invention in its open and extended state.

Referring now to FIG. 2, a second side view of the preferred invention in shearing configuration is detailed. Here, handles 101 and 103 have been spread apart by the action of compression spring 105 resulting in a changed orientation of levers 110 and 112 and the moving out of bullet nose element 159 away from clamping barrel 137. As can be seen in FIG. 2, bullet nose element 159 has penetrated through an opening in the sheet metal or other material 171 where the portion of sheet metal 171 which is wished to be sheared has been aligned with the bottom edge 140 of rotatable shear segment 139 beveled shear surface 138. The handles are now brought together pulling bullet nose element 159 surface 161 toward the sheet metal 171 which at this time, would begin to lay against shearing edge 140 of rotatable shear segment 139.

Continued pressure upon the handles results in bullet nose element 159 surface 161 being drawn towards clamping barrel 137 pushing with it sheet metal 171 past the shearing edge 140.

As had been earlier mentioned the most common application of the subject invention is to remove the concentric knockouts in electrical switches, meter boxes, circuit breaker boxes, electrical wire gutters and the like where the knockouts have been pre-formed by partially punched concentric rings in the sheet metal or other material. FIG. 3 illustrates one of these concentric knockouts in a piece of electrical wire gutter used for runs of electrical wiring, the concentric knockouts enabling an electrician to join to the gutter at right angles, electrical conduit for electrical wiring to enter and leave the interior of the gutter. Here, the central knockout 181 has been partially punched around its total periphery less one land with the surrounding concentric rings 183, 185, and 187 being only partially pre-punched, there being left three solid metal connections or lands between the top surface of the gutter 189 all the way into the central concentric knockout 181. In some cases the central knockout 181 has no lands and is held in by friction. As the inventive tool is used, central knockout 181 is hammered inward by the bullet nose element 159 of the inventive tool, much as one would swing a hammer, until it falls through completely. In the event that it hangs by the one land, the inventive device can grip the central knockout 181 between surfaces 161 and 136 and move the tool back and forth until the metal fatigues and breaks off completely. Its diameter is slightly greater than the largest diameter of bullet nose element 159 permitting the element 159 to be placed interiorly to the hole which has been previously formed. The handles of the inventive tool are permitted to swing apart and the tool is moved over until the shearing edge 140 of the rotatable shear segment 139 is placed over one of the unpunched portions of concentric ring 183. The handle is closed together and bullet nose element 159 flat circular surface 161 pushes sheet metal gutter 189 concentric ring 183 towards rotatable shear segment 139 shearing edge 140 and the unpunched portion of concentric ring 183 is sheared. At that point, the handles are permitted to go apart disengaging bullet nose element 159 from clamping barrel 137, rotatable shear segment 139 is rotated to the next of the unpunched segments of concentric ring 183, and the operation is repeated. Thirdly, the rotatable shear segment 139 is rotated to the last remaining unpunched segment and again the operation repeated. Should it be desired to enlarge the hole to the next concentric knockout, the operation is repeated upon the three unpunched segments of concentric ring 185 and this ring is punched out and removed. Again, if necessary, the operation is repeated for the largest concentric ring 187. Again, if the operator should misalign the shear cut and the ring land so that a complete shear is not obtained, the ring land may be severed by fatiguing the metal by hold the ring between the tool surfaces 161 and 136 and rocking the tool back and forth.

It is noted that while the concentric rings have been punched in their ascending order, it is possible to jump a concentric ring and cut the next larger concentric ring out. This depends only upon the distance between the shearing edge 140 of rotatable shear segment 139 and the side of the shaft 151 where it joins the bullet nose element 159. In the preferred embodiment shown in FIG. 1 and FIG. 2, it is noted that shaft 151 has been slightly undercut next to bullet nose element 159 to permit larger distances to be covered.

Figure 4:
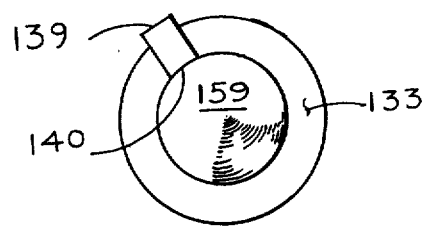
FIG. 4 is the front end view of the shearing and punching assembly of the subject invention.

Reference now to FIG. 4, a front end view of the bullet nose 159 is shown. Centrally to FIG. 4 is the bullet nose element 159 surrounded by knurled knob 135 attached to clamping barrel 137 (which is hidden by bullet nose element 159) and rotatable shear segment 139 which, at the point joining bullet nose element 159, is shearing edge 140.

Figure 5:
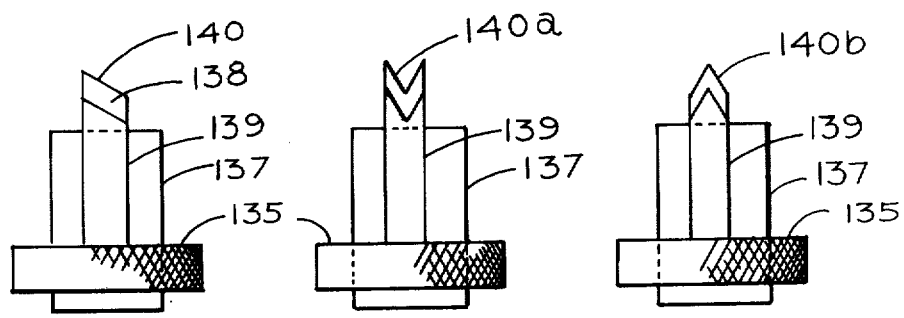
FIG. 5 is a top view of the shearing segment showing alternate embodiments of the shearing surface and edge.

Referring now to FIG. 5, a top view of a portion of the shear assembly is shown where the rotatable shear segment 139 is detailed with various types of cutting edges. Proceding from left to right, the cutting edge 140, 140a, and 140b are shown in different shaped configurations, 140 being nominally the shearing edge shown in FIGS. 1 and 2 and 140a and 140b being alternate embodiments thereof. The beveled surface 138 is shown in the left figure of FIG. 5 with the other types of beveled surfaces connected with the rotatable shear segment 139 shown in the other two figures of FIG. 5. Additionally shown in all of the figures shown in FIG. 5 is the balance of the rotatable shear segment 139, the clamping barrel 137, and the knurled knob 135.

While a preferred embodiment of the invention together with alternate embodiments of the invention has been shown and described, it will be appreciated that there is no intent to limit the invention by such disclosure, but rather it is intended to cover all modifications and alternate constructions falling within the spirit and the scope of the invention as defined in the appended claims.

I claim:

1. A device to remove concentric metal knockouts from electrical apparatus comprising handles adapted to open and close about a pivotal point, a first lever operably attached at a first end to one of said handles proximate said handles pivotal point, a second lever operably attached at a first end to the other of said handles proximate said handles pivotal point, said first and second lever operably attached to each other to form a common fulcrum, and a shearing and punch assembly operably attached to said first and second levers second end.

2. The device for removing concentric metal knockouts as defined in claim 1 wherein said first and second lever common fulcrum is located between said first and second lever ends.

3. The device for removing concentric metal knockouts as defined in claim 2 wherein said shearing and punch assembly comprises a shaft pivotally attached to said first lever second end, and a concentric cylinder assembly annularly surrounding a portion of said shaft.

4. The device to remove concentric metal knockouts as defined in claim 3 wherein said concentric cylinder assembly includes a first and second concentric cylinders, said first concentric cylinder periphery pivotally attached to said second lever second end, and said second concentric cylinder overlapping a portion of said first concentric cylinder.

5. The device to remove concentric metal knockouts as defined in claim 4 wherein said second concentric cylinder is in rotational relationship with said first concentric cylinder, said second cylinder also defining shear element means protruding beyond said second concentric cylinder peripheral surface.

6. The device to remove concentric metal knockouts as defined in claim 5 wherein said shearing and punch assembly shaft defines rounded end punch means, said end punch means extending beyond said shear element whereby said handles may be grasped by an operator and the end punch means may be used to punch out the center knockout of concentric knockouts in electrical apparatus.

7. The device to remove concentric metal knockouts as defined in claim 6 wherein said shaft rounded end punch means defines a flat planar annular wall surface opposite said rounded end whereby when said handles are spread, said first and second lever first ends are spread and said first and second levers second end are closed, said concentric cylinder assembly slides on said shaft towards said first lever second end, said concentric cylinder assembly separating away from said shaft means annular wall surface permitting entrance of metal knockouts of electrical apparatus between said shear element and said shaft annular wall surface to permit, upon closing of the handles, said shear element to engage lands in the electrical apparatus metal concentric knockouts and permit said shaft annular wall surface to urge said shear element through said land and sever same, and open said handles and separate the shear element and annular wall surface of said shaft in order to free the shear element, and then rotate the second concentric cylinder about said first concentric cylinder and engage another land in the metal electrical apparatus, and with the closing of the handles compress the metal electrical apparatus between the shear surface and the annular wall surface of the shaft and thereby sever the second land.

8. The device to remove concentric knockouts as defined in claim 7 wherein said shear element protruding beyond said second concentric cylinder defines a beveled shear cutting edge.

9. The device to remove concentric knockouts as defined in claim 7 where said shear element protruding beyond said second concentric cylinder defines a V-shaped cutting edge.

10. The device to remove concentric knockouts as defined in claim 7 again wherein said shear element protruding beyond said second concentric cylinder peripheral surface defines an inverted V-shaped cutting edge.

* * * * *